US011767816B2

United States Patent
Ono et al.

(10) Patent No.: US 11,767,816 B2
(45) Date of Patent: Sep. 26, 2023

(54) ENGINE SYSTEM

(71) Applicant: Mazda Motor Corporation, Hiroshima (JP)

(72) Inventors: Ryohei Ono, Aki-gun (JP); Yuji Harada, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/868,472

(22) Filed: Jul. 19, 2022

(65) Prior Publication Data
US 2023/0035754 A1 Feb. 2, 2023

(30) Foreign Application Priority Data

Jul. 30, 2021 (JP) ................................ 2021-125485

(51) Int. Cl.
*F02P 5/15* (2006.01)
*F02P 15/02* (2006.01)
*F02D 41/40* (2006.01)

(52) U.S. Cl.
CPC ............. *F02P 5/1502* (2013.01); *F02P 15/02* (2013.01); *F02D 41/401* (2013.01); *F02D 2200/101* (2013.01)

(58) Field of Classification Search
CPC .. F02P 15/02; F02P 15/08; F02P 5/045; F02P 5/1502; F02D 2200/101; F02D 37/02; F02D 41/401; F02B 19/12
See application file for complete search history.

(56) References Cited

U.S. PATENT DOCUMENTS 4,287,862 A * 9/1981 Noguchi ................... F02B 5/00
123/638
7,740,009 B2 * 6/2010 Shelby .................... F02P 15/08
123/304
(Continued)

FOREIGN PATENT DOCUMENTS

EP 3453856 A1 3/2019
EP 3855008 A1 7/2021
(Continued)

OTHER PUBLICATIONS

European Patent Office, Extended European Search Report Issued in Application 22183558.0, dated Dec. 22, 2022, Germany, 9 pages.

*Primary Examiner* — Carl C Staubach
(74) *Attorney, Agent, or Firm* — Alleman Hall Creasman & Tuttle LLP

(57) ABSTRACT

An engine system is provided, which includes a cylinder block, a cylinder head, a piston, a main combustion chamber, a subchamber, an injector that injects fuel into the main combustion chamber, a main spark plug that ignites a mixture gas inside the main combustion chamber, a subspark plug that ignites the mixture gas inside the subchamber, and a controller electrically connected to the injector and the main spark plug and the subspark plug. In a low-load range where an engine load is below a given reference load, the controller controls the main spark plug and the subspark plug so that the subignition is performed after performing the main ignition, and the controller retards the timing of the subignition in a high-speed range where an engine speed is above a given reference engine speed, compared with a low-speed range below the reference engine speed.

20 Claims, 9 Drawing Sheets

(56) References Cited

U.S. PATENT DOCUMENTS

| | | | |
|---|---|---|---|
| 8,006,666 B2* | 8/2011 | Ashida | F02B 19/12 |
| | | | 123/638 |
| 11,156,198 B1* | 10/2021 | Glugla | F02P 3/05 |
| 11,598,245 B2* | 3/2023 | Ono | F02B 19/1023 |
| 2009/0259387 A1* | 10/2009 | Kakuya | F02D 41/3035 |
| | | | 123/295 |
| 2019/0078498 A1* | 3/2019 | Bedogni | F02B 19/1019 |
| 2019/0323415 A1* | 10/2019 | Corrigan | F01N 3/2006 |
| 2021/0222643 A1* | 7/2021 | Nagatsu | F02P 15/02 |
| 2021/0262393 A1* | 8/2021 | Leone | F02C 7/266 |
| 2023/0029629 A1* | 2/2023 | Ono | F02B 9/02 |
| 2023/0029748 A1* | 2/2023 | Ono | F02P 5/045 |
| 2023/0030297 A1* | 2/2023 | Ono | F02M 26/15 |
| 2023/0035754 A1* | 2/2023 | Ono | F02D 37/02 |
| 2023/0035987 A1* | 2/2023 | Ono | F02P 15/08 |

FOREIGN PATENT DOCUMENTS

| | | |
|---|---|---|
| JP | 2002070558 A | 3/2002 |
| JP | 2007255370 A | 10/2007 |
| WO | 2022106189 A1 | 5/2022 |

* cited by examiner

ENGINE SYSTEM

TECHNICAL FIELD

The present disclosure relates to an engine system provided with a main combustion chamber and a subchamber.

BACKGROUND OF THE DISCLOSURE

Engines provided with a main combustion chamber using a cylinder, and a subchamber which communicates with the main combustion chamber are known. For example, JP2007-255370A discloses an engine where a fuel injection device and a spark plug are disposed at both the main combustion chamber and the subchamber. According to this engine, unburnt mixture gas which exists in the main combustion chamber combusts by combusting a mixture gas inside the main combustion chamber, and then combusting the mixture gas inside the subchamber to blow off flame inside the subchamber to the main combustion chamber. Therefore, the unburnt mixture gas remaining inside the main combustion chamber can be suppressed, and, as a result, fuel efficiency and emission performance can be improved.

Unlike the engine of JP2007-255370A, if a configuration in which the fuel injection device is disposed only at the main combustion chamber for the purpose of simplifying the structure is adopted, it may become difficult for the mixture gas to be introduced into the subchamber. For example, in a low-load operating range of the engine, since the amount of air taken into the main combustion chamber is comparatively small, it is difficult for the mixture gas to be introduced into the subchamber. Therefore, even if an ignition is performed by the spark plug of the subchamber, a misfire may occur because the mixture gas is insufficient. As a result, an improvement effect of fuel efficiency and emission performance which is acquired by providing the subchamber in addition to the main combustion chamber, may not fully be demonstrated.

SUMMARY OF THE DISCLOSURE

One purpose of the present disclosure is to provide an engine system provided with a main combustion chamber and a subchamber, capable of securely improving fuel efficiency and emission performance.

According to one aspect of the present disclosure, an engine system is provided, which includes a cylinder block and a cylinder head that form a cylinder, a piston reciprocatably accommodated in the cylinder, a main combustion chamber defined by the cylinder block, the cylinder head, and the piston, a subchamber that is separated from the main combustion chamber by a partition, and communicates with the main combustion chamber through a communicating hole formed in the partition, an injector that injects fuel into the main combustion chamber, a main spark plug that performs main ignition for igniting a mixture gas inside the main combustion chamber, a subspark plug that performs subignition for igniting the mixture gas inside the subchamber, and a controller that is electrically connected to, and outputs an electric signal for control to, the injector, the main spark plug, and the subspark plug. In a low-load range where an engine load is below a given reference load, the controller controls the main spark plug and the sub spark plug so that the subignition is performed after the main ignition, and the controller retards the timing of the subignition in a high-speed range where the engine speed is above a given reference engine speed, compared with a low-speed range where the engine speed is below the reference engine speed.

In the low-load operating range, since the amount of air taken into the main combustion chamber is comparatively small, it becomes difficult for the mixture gas to be introduced into the subchamber. Even if the subignition is performed by the subspark plug in the state where the sufficient mixture gas does not exist in the subchamber, a misfire may still occur. If the misfire occurs, the flame cannot be blown off from the subchamber, and it cannot contribute to combustion of unburnt mixture gas which exists in the main combustion chamber. According to this configuration, the main ignition is performed first, and then the subignition is performed. Therefore, the inflow of the mixture gas to the subchamber is stimulated. That is, since the combustion pressure of the flame propagation combustion caused by the main ignition overlaps with the pushing force of the piston, the force of pushing the mixture gas into the subchamber increases. Therefore, the introduction of the mixture gas into the subchamber is stimulated. As a result, the misfire described above does not occur, and the flame can be blown off from the subchamber by executing the subignition, and therefore, the unburnt mixture gas which remains inside the main combustion chamber can be combusted appropriately.

Further, when the engine load is low, the subignition timing is retarded in the high-speed range, compared with in the low-speed range. As the engine speed becomes higher, the time which can be used for pushing the mixture gas into the subchamber becomes shorter. Therefore, by retarding the subignition timing in the high-speed range, a time for pushing the mixture gas into the subchamber by the combustion pressure of the flame propagation combustion can fully be secured. Therefore, the misfire of the subignition can further be suppressed.

The controller may advance the timing of the main ignition as the engine speed becomes higher.

According to this configuration, since the timing of the main ignition is advanced as the engine speed becomes higher, the time for pushing the mixture gas into the subchamber can be secured fully according to the engine speed.

The controller may set an ignition phase difference between the subignition and the main ignition to be larger as the engine speed becomes higher.

According to this configuration, since the ignition phase difference is made larger as the engine speed becomes higher, the time for pushing the mixture gas into the subchamber can be secured fully according to the engine speed.

The main spark plug may be attached so that an electrode part thereof is located on an intake port side in a ceiling surface of the main combustion chamber, and the subspark plug may be attached to a position on an exhaust port side in the ceiling surface of the main combustion chamber.

The injector may be disposed so that a tip-end part thereof is located at the center of the ceiling surface of the main combustion chamber.

In the low-load range where the engine load is below the given reference load, the injector may inject fuel in intake stroke.

In a low-speed low-load range where the engine speed is below a second given reference engine speed below the reference engine speed and the engine load is below a second given reference engine load higher than the reference engine load, the main ignition and subignition are suspended.

DETAILED DESCRIPTION OF THE DISCLOSURE

Hereinafter, an engine system according to one embodiment of the present disclosure is described in detail with reference to the accompanying drawings. In this embodiment, a case where the engine system is mounted on a vehicle (e.g., an automobile) as a power source for propelling the vehicle is illustrated.

Entire Configuration of Engine

Figure 1:
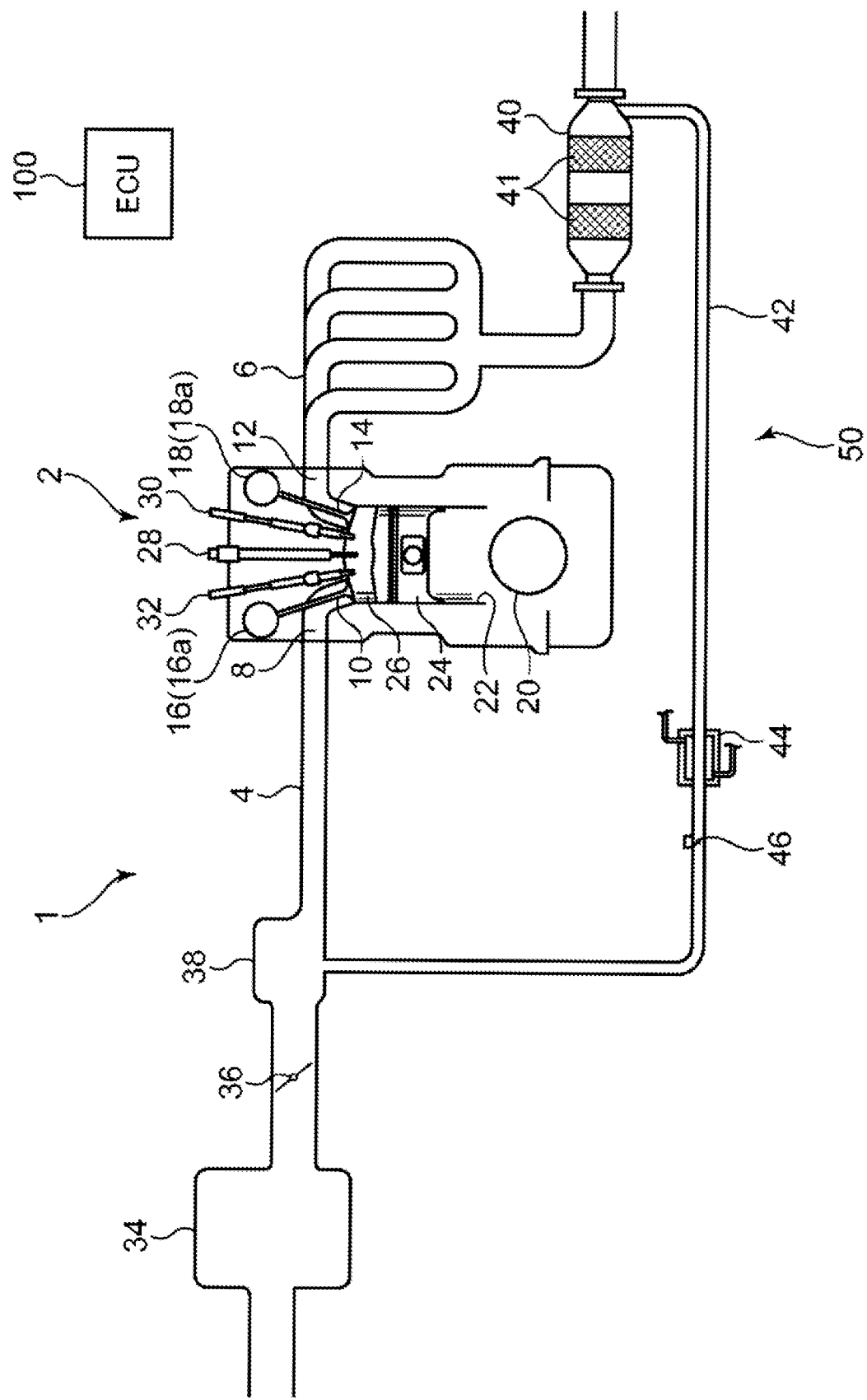
FIG. 1 is an outline block diagram of an engine system according to one embodiment of the present disclosure.

FIG. 1 is an outline block diagram of an engine system 1 according to this embodiment of the present disclosure. The engine system 1 includes an engine body 2, an intake passage 4 through which air introduced into the engine body 2 (intake air) circulates therein, an exhaust passage 6 through which exhaust gas drawn from the engine body 2 circulates therein, and an exhaust gas recirculation (EGR) system 50. The engine body 2 is a four-stroke gasoline engine which mainly uses gasoline as fuel, and fuel containing gasoline is supplied to the engine body 2.

Figure 2:
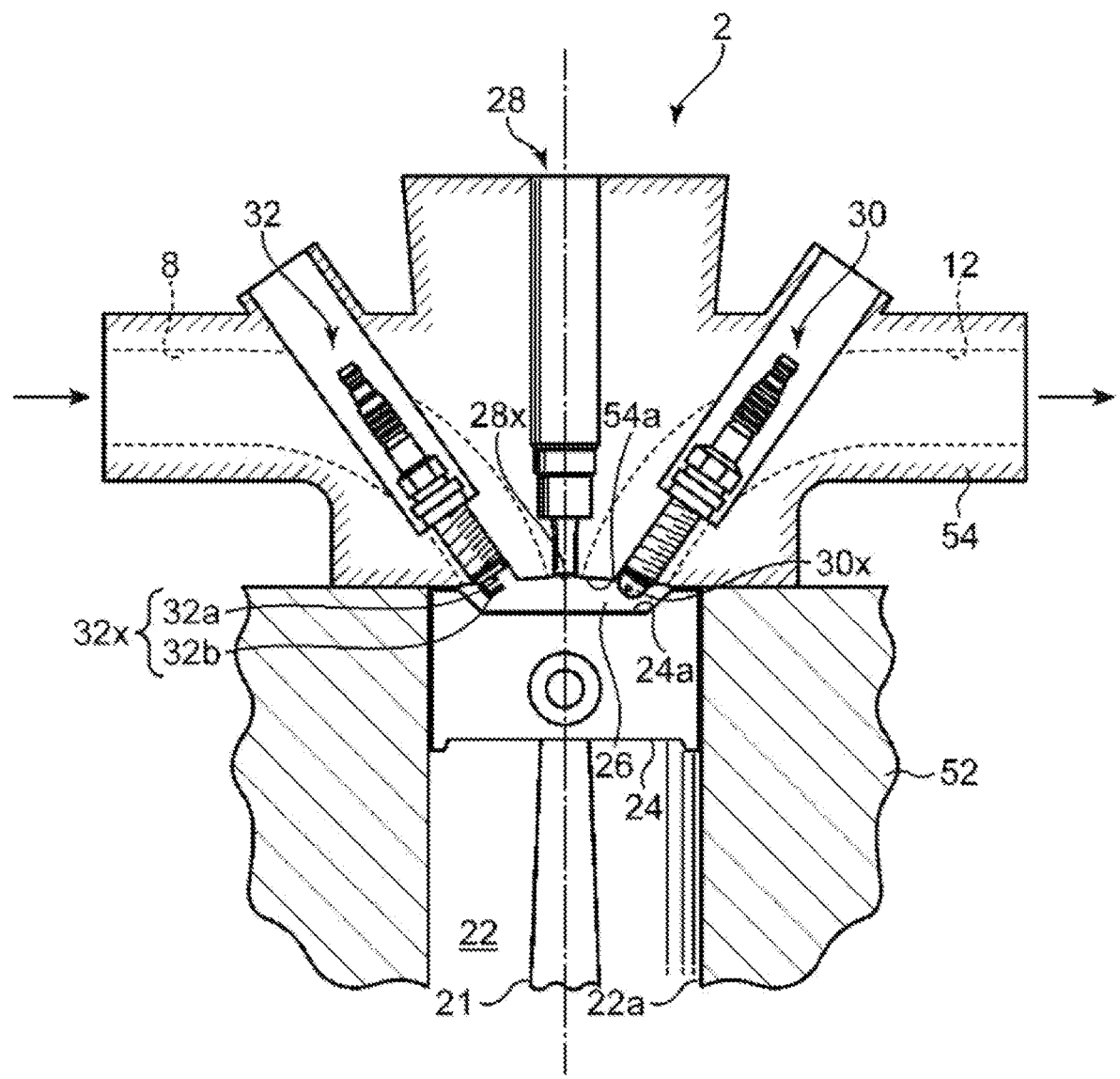
FIG. 2 is an outline cross-sectional view of an engine body.

FIG. 2 is an outline cross-sectional view of the engine body 2. The engine body 2 is a multi-cylinder engine having a plurality of cylinders 22. For example, the engine body 2 has four cylinders 22 lined up single file (lined up in a direction perpendicular to the drawing sheet of FIG. 1). The engine body 2 includes a cylinder block 52, a cylinder head 54, and a plurality of pistons 24. The cylinder 22 is formed by the cylinder block 52 and the cylinder head 54. Inside the cylinder block 52, a plurality of cylindrical spaces which form a plurality of cylinders 22 are provided. The cylinder head 54 has a bottom surface 54a which closes upper-end openings of the cylindrical spaces, and is attached to an upper surface of the cylinder block 52. The pistons 24 are reciprocatably accommodated in the respective cylinders 22. Note that, in this embodiment, a direction from the cylinder block 52 toward the cylinder head 54 is treated as "upward" and the opposite direction is treated as "downward." These are to facilitate the explanation and are not intended to limit the installation posture of the engine body 2.

A space used as a main combustion chamber 26 is formed above the piston 24 of each cylinder 22. The main combustion chamber 26 is defined by an inner circumferential surface 22a of the cylinder 22 formed in the cylinder block 52, the bottom surface 54a of the cylinder head 54, and a crown surface 24a of the piston 24. Fuel is supplied to the main combustion chamber 26 by injection from an injector 28 (described later). A mixture gas comprised of the supplied fuel and air combusts inside the main combustion chamber 26, and the piston 24 reciprocates in the up-and-down direction by receiving the expansion force of the combustion.

A crankshaft 20 which is an output shaft of the engine body 2 is provided to a lower part of the cylinder block 52 (below the piston 24). The crankshaft 20 is coupled to the piston 24 of each cylinder 22 via a connecting rod 21, and rotates on the center axis according to the reciprocating movement of the piston 24.

In the cylinder head 54, an intake port 8 and an exhaust port 12 are formed for every cylinder 22. The intake port 8 is a port for introducing the air supplied from the intake passage 4 into the main combustion chamber 26. The exhaust port 12 is a port for deriving the exhaust gas generated inside the main combustion chamber 26 to the exhaust passage 6. An intake valve 10 is provided to open and close an opening of the intake port 8 on the main combustion chamber 26 side. An exhaust valve 14 is provided to open and close an opening of the exhaust port 12 on the main combustion chamber 26 side. In this embodiment, two intake valves 10 and two exhaust valves 14 are provided to each cylinder 22.

The intake valve 10 and the exhaust valve 14 are opened and closed by respective valve operating mechanisms 16 and 18 disposed at the cylinder head 54 in an interlocked fashion with the rotation of the crankshaft 20. The valve operating mechanism 16 for the intake valves 10 is provided with variable valve lift mechanism (intake S-VT) 16a which is electrically controlled so as to change valve lifts and opening-and-closing timings of the intake valves 10. Similarly, the valve operating mechanism 18 for the exhaust valves 14 is provided with a variable valve lift mechanism (exhaust S-VT) 18a which is electrically controlled so as to change valve lifts and opening-and-closing timings of the exhaust valves 14.

The cylinder head 54 is provided with a set of the injector 28, a main spark plug 32, and a subignition unit 30 for each cylinder 22. The injector 28 is an injection valve which injects fuel into the main combustion chamber 26. An injection port through which fuel is injected is formed in a tip-end part 28x of the injector 28. The injector 28 is attached to the cylinder head 54 so that its tip-end part 28x faces the main combustion chamber 26 from above. The injector 28 is disposed so that its tip-end part 28x is located at the center of a ceiling surface of the main combustion chamber 26 (in more detail, located on the axis of the cylinder 22).

The main spark plug 32 performs a main ignition for igniting the mixture gas inside the main combustion chamber 26 by spark discharge. An electrode part 32x for discharging sparks is provided to a tip end of the main spark plug 32. The electrode part 32x includes a center electrode 32a, and a side electrode 32b for the ground. The main spark plug 32 is attached to the cylinder head 54 so that its electrode part 32x faces the main combustion chamber 26 from above. The main spark plug 32 is disposed so that electrode part 32x is located in the ceiling surface of the main combustion chamber 26, on the intake port 8 side with respect to the tip-end part 28x of the injector 28.

The subignition unit 30 is a device for injecting flame into the main combustion chamber 26. The subignition unit 30 will be explained in detail later.

The intake passage 4 is connected to one of a plurality of side surfaces of the cylinder head 54 so as to communicate with the intake port 8 of each cylinder 22. The intake passage 4 is provided with, sequentially from an upstream side, an air cleaner 34 which removes foreign matter contained in intake air, an openable and closable throttle valve 36 which adjusts a flow rate of intake air, and a surge tank 38. A downstream end of the intake passage 4 branches to a plurality of passages, and these branched passages are connected to the respective intake ports 8. In each cylinder 22, a swirl valve 56 (see FIG. 5) is provided to the branch passage connected to one of the two intake ports 8 to open and close this intake port 8.

The exhaust passage 6 is connected to one of the plurality of side surface (the side surface opposite from the intake passage 4) of the cylinder head 54 so as to communicate with the exhaust port 12 of each cylinder 22. The exhaust passage 6 is provided with a catalyst device 40 having a built-in catalyst 41, such as a three-way catalyst.

The EGR system 50 is a device for recirculating part of the exhaust gas to the intake passage 4 as EGR gas. The EGR system 50 has an EGR passage 42 which communicates the exhaust passage 6 with the intake passage 4, and an EGR valve 46 and an EGR cooler 44 which are provided to the EGR passage 42. An upstream end of the EGR passage 42 is connected to a downstream end of the catalyst device 40 which is a part of the exhaust passage 6 downstream of the catalyst 41. A downstream end of the EGR passage 42 is connected to the surge tank 38. The EGR valve 46 is a valve which opens and closes the EGR passage 42 to adjust a flow rate of EGR gas. The EGR cooler 44 is a heat exchanger for cooling EGR gas. The EGR cooler 44 is disposed upstream of the EGR valve 46.

Details of Subignition Unit

Figure 3:
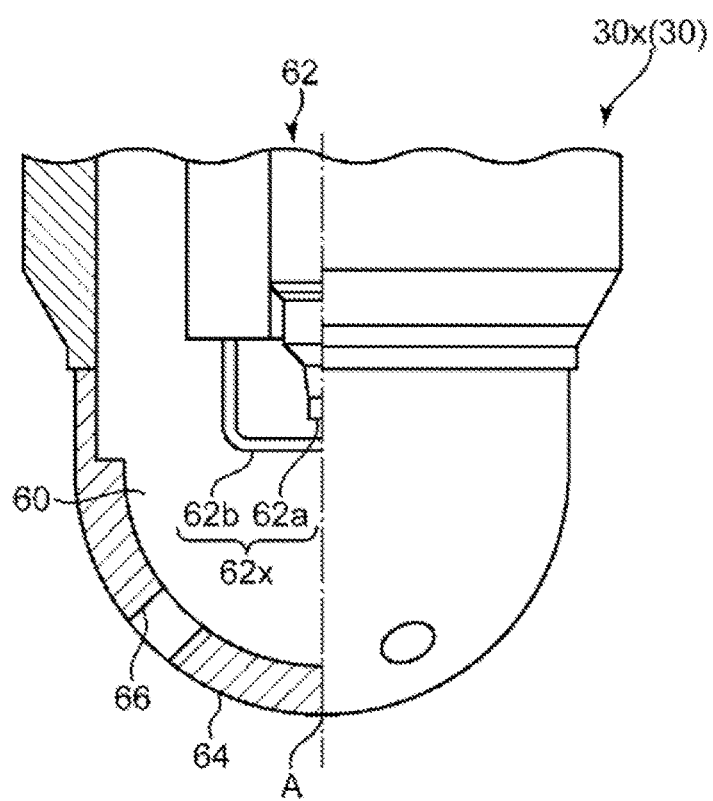
FIG. 3 is a partial cross-sectional view of a tip-end part of a subignition unit when seen from the side.
Figure 4:
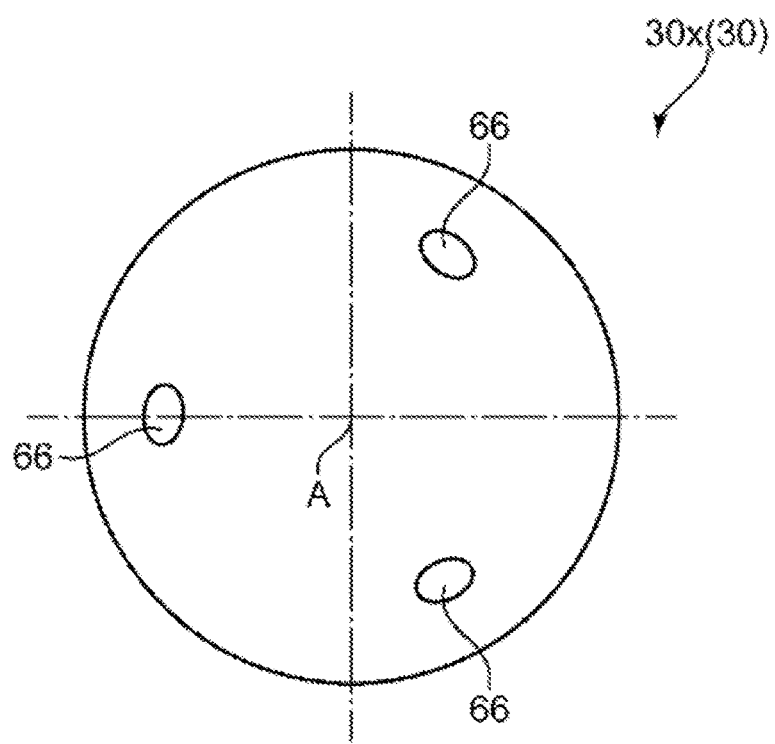
FIG. 4 is a plan view of the tip-end part of the subignition unit.

FIG. 3 is a partial cross-sectional view of a tip-end part 30x of the subignition unit 30 when seen from the side, and FIG. 4 is a plan view of the tip-end part 30x when seen from below. The subignition unit 30 includes a subspark plug 62, a cover member 64 (partition) attached to a tip end of the subspark plug 62, and a subchamber 60 which is an interior space covered with the cover member 64.

The subspark plug 62 performs subignition for igniting the mixture gas inside the subchamber 60 by spark discharge. A tip end of the subspark plug 62 is provided with an electrode part 62x which discharges sparks. The electrode part 62x includes a center electrode 62a and a side electrode 62b for the ground. The cover member 64 constitutes the tip-end part 30x of the subignition unit 30, and surrounds the electrode part 62x of the subspark plug 62. The cover member 64 has a semi-spherical shape which bulges downwardly. The subchamber 60 is a space inside the cover member 64. In detail, the subchamber 60 is a space around and near the electrode part 62x of the subspark plug 62, which is defined by the cover member 64. Since it is such a space, the size of the subchamber 60 is narrow, compared with the main combustion chamber 26. The electrode part 62x of the subspark plug 62 is disposed so as to face the subchamber 60, and therefore, it is possible of the subignition described above.

As illustrated in FIG. 2, the subignition unit 30 is attached to the cylinder head 54 so that its tip-end part 30x faces the main combustion chamber 26 from above. The subignition unit 30 is attached to a position in the ceiling surface of the main combustion chamber 26 (the bottom surface 54a of the cylinder head 54) on the exhaust port 12 side with respect to the injector 28. In this attaching state, a substantially entire part of the cover member 64 is located inside the main combustion chamber 26. As a result, the cover member 64 serves as a partition which separates the subchamber 60 from the main combustion chamber 26.

A plurality of communicating holes 66 are formed in the cover member 64 so that they penetrate the cover member 64 and communicate with the main combustion chamber 26. The subchamber 60 which is an internal space of the cover member 64 communicates with the main combustion chamber 26 via these communicating holes 66. In this embodiment, one example in which three communicating holes 66 are formed in the cover member 64 is illustrated. As illustrated in FIG. 4, the three communicating holes 66 are disposed at an interval of 120° around the axis of the cover member 64 which passes through a vertex A of the cover member 64. Further, as illustrated in FIG. 3, each communicating hole 66 is obliquely disposed, in a side view, at a position about 45° from the vertex A. In this embodiment, the radius of the cover member 64 is 5 mm, the thickness is 1 mm, and the diameter of each communicating hole 66 is 1.2 mm.

The subignition unit 30 having the configuration described above functions as a device for injecting flame into the main combustion chamber 26. When fuel is injected into the main combustion chamber 26 from the injector 28, and the mixture gas comprised of air and fuel is formed inside the main combustion chamber 26, part of this mixture gas is introduced into the subchamber 60 via the communicating holes 66. When the spark discharge (subignition) is performed by the sub spark plug 62 in a state where a sufficient amount of the mixture gas exists inside the subchamber 60, the mixture gas begins combustion inside the subchamber 60 and flame propagates from near the electrode part 62x of the subspark plug 62 to the circumference. Then, this flame is blown off to the main combustion chamber 26 via the communicating holes 66, and propagates to the mixture gas inside the main combustion chamber 26.

Here, when the main ignition is performed to the mixture gas inside the main combustion chamber 26 by the main spark plug 32, the flame propagates to the circumference also from near the electrode part 32x of the main spark plug 32. Thus, when the ignition is performed by both the main spark plug 32 and the subspark plug 62, and the mixture gas begins the combustion appropriately inside the main combustion chamber 26 and the subchamber 60, the flame propagates to the mixture gas inside the main combustion chamber 26 from a plurality of positions (the positions of the electrode part 32x and the communicating holes 66). Therefore, the combustion speed of the mixture gas inside the main combustion chamber 26 is increased, fuel efficiency is improved, and the occurrence of knocking is suppressed.

Control System

Figure 5:
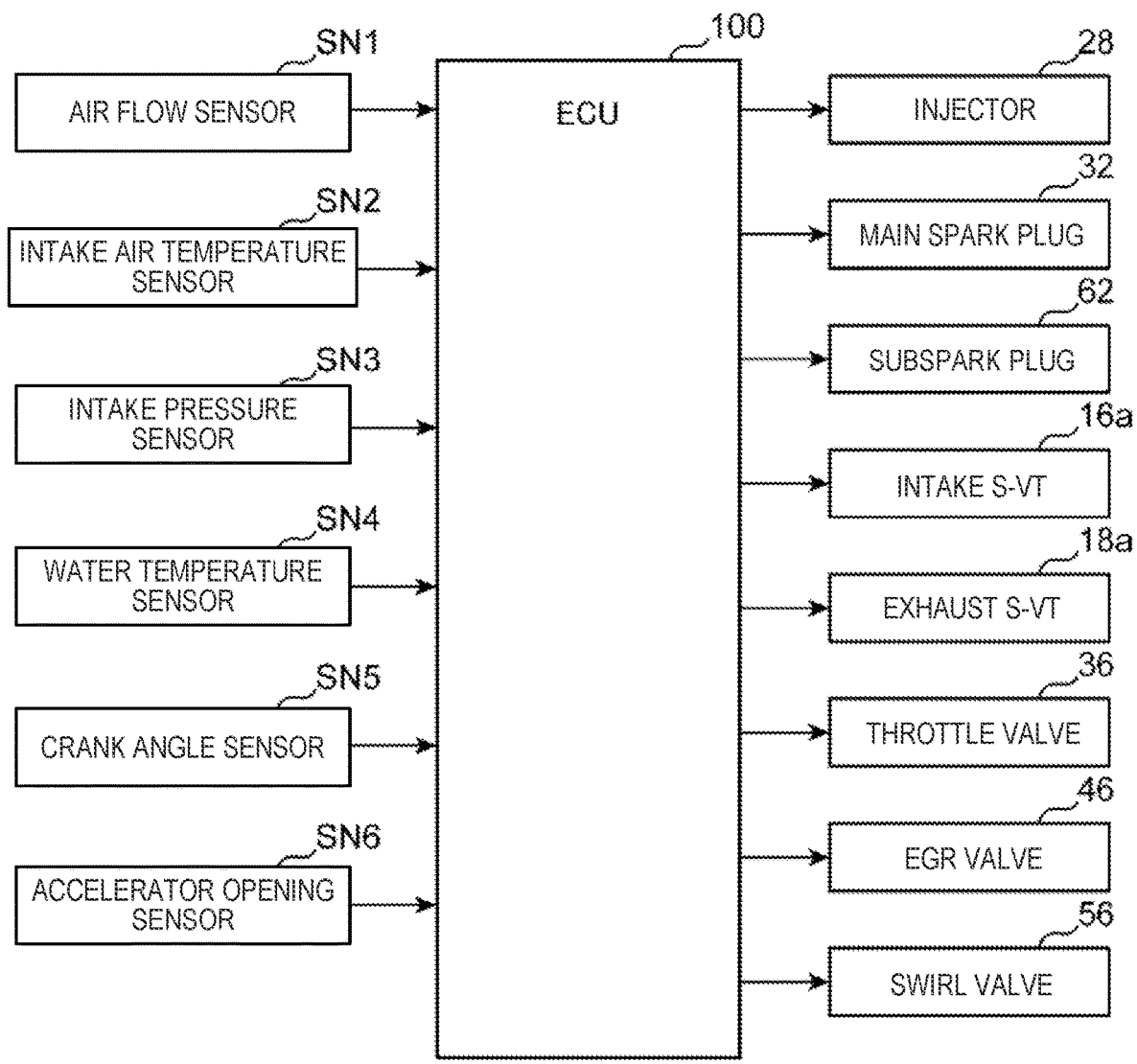
FIG. 5 is a block diagram illustrating a control configuration of the engine system.

FIG. 5 is a block diagram illustrating a control system of the engine system 1. The engine system 1 includes an electronic control unit (ECU) 100 (controller) which comprehensively controls function parts provided to the engine system 1. The ECU 100 is electrically connected to the injector 28, the main spark plug 32, the subspark plug 62, etc. which are described above, and outputs an electric signal for control to each of these devices. The ECU 100 is comprised of a microcomputer including a processor (e.g., a central processing unit (CPU)) which performs various calculation processings, memory such as a ROM and a RAM, and various kinds of input and output buses.

Detection information by the various sensors are inputted into the ECU 100. The ECU 100 carries out various determinations, calculations, etc. based on the inputted information from the various sensors, and controls each part of the engine. Detection values of an air flow sensor SN1, an intake air temperature sensor SN2, an intake pressure sensor SN3, a water temperature sensor SN4, and a crank angle sensor SN5, which are provided to the engine system 1, and an accelerator opening sensor SN6 provided to the vehicle, are inputted into the ECU 100.

The air flow sensor SN1 detects a flow rate of intake air which passes through the intake passage 4 and is introduced into the engine body 2. The intake air temperature sensor SN2 and the intake pressure sensor SN3 detect a temperature and a pressure of intake air introduced into the engine body 2, respectively. The water temperature sensor SN4 detects a temperature of engine coolant for cooling the engine body 2. The crank angle sensor SN5 detects a crank angle which is a turning angle of the crankshaft 20, and an engine speed. The accelerator opening sensor SN6 detects an accelerator opening which is an opening of an accelerator pedal (not illustrated) provided to the vehicle.

Figure 6:
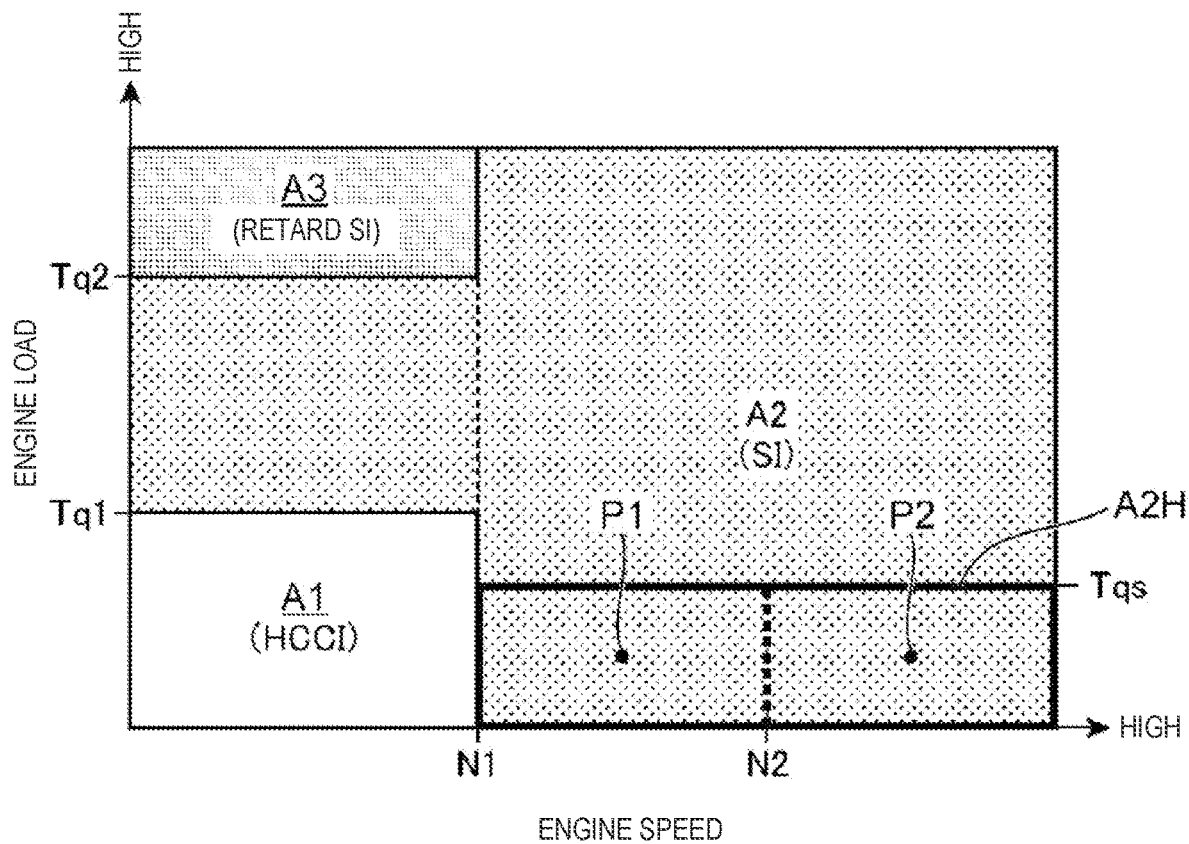
FIG. 6 is a map illustrating an operating range of the engine.

FIG. 6 is a map illustrating an operating range of the engine, where the horizontal axis is an engine speed and the vertical axis is an engine load. The operating range of the engine is roughly divided into three ranges A1-A3 (a first range A1, a second range A2, and a third range A3) according to the control content of the injector 28, the main spark plug 32, and the subspark plug 62.

The first range A1 is a low-speed low-load range where the engine speed is below a given first speed N1 and the engine load is below a given first load Tq1. The third range A3 is a low-speed high-load range where the engine speed is below the first speed N1 and the engine load is above a given second load Tq2. The second range A2 is a range other than the first range A1 and the third range A3. That is, the second range A2 is comprised of a range where the engine speed is below the first speed N1, and the engine load is above the first load Tq1 and below the second load Tq2, and a range where the engine speed is above the first speed N1.

In the first range A1, the injector 28, the main spark plug 32, and the subspark plug 62 are controlled so that HCCI (Homogeneous Compression Charge Ignition) combustion is realized. In detail, fuel is injected from the injector 28 in intake stroke. In addition, igniting operations of the main spark plug 32 and the subspark plug 62 are suspended.

The injector 28 is disposed so as to face the main combustion chamber 26, and fuel injected from the injector 28 is diffused throughout the main combustion chamber 26. Thus, in the first range A1, since fuel is injected from the injector 28 in intake stroke, fuel and air can be fully mixed inside the main combustion chamber 26 by reaching a compression top dead center (TDC). In the first range A1, this fully-mixed mixture gas (premixed mixture gas) self-ignites near the compression TDC when it is increased in the temperature and the pressure by the compression of the piston 24. In the HCCI combustion, an air-fuel ratio of the mixture gas is made leaner (higher) to a level where flame propagation is impossible, and therefore, fuel efficiency can be improved. Therefore, in the first range A1, the opening of the throttle valve 36 is adjusted so that the air-fuel ratio of the mixture gas inside the main combustion chamber 26 becomes leaner than the theoretical air-fuel ratio (14.7:1).

In the second range A2, the injector 28, the main spark plug 32, and the subspark plug 62 are controlled so that flame propagation combustion (spark ignition (SI) combustion) is realized. In the second range A2, fuel is injected from the injector 28 in intake stroke, similar to the first range A1. On the other hand, in the second range A2, the main spark plug 32 and the subspark plug 62 are activated so that the main ignition and the subignition are performed by both the spark plugs 32 and 62. Further, the opening of the throttle valve 36 is adjusted so that the air-fuel ratio of the mixture gas inside the main combustion chamber 26 becomes near the theoretical air-fuel ratio. In the second range A2, a flame kernel is generated around each of the electrode parts 32x and 62x by the main ignition by the main spark plug 32 and the subignition by the subspark plug 62. Since the flame propagates from these flame kernels to the circumference, the mixture gas inside the main combustion chamber 26 and the subchamber 60 combust.

In the third range A3, the injector 28, the main spark plug 32, and the subspark plug 62 are controlled so that retarded SI combustion in which the fuel injection timing is retarded from the second range A2 is realized. In the third range A3, fuel is injected from the injector 28 in compression stroke, not in intake stroke. This is because preignition in which the mixture gas self-ignites before the main ignition may occur if the fuel injection is performed during intake stroke in the low-speed high-load third range A3.

In this embodiment, a specific ignition control is performed in a specific range A2H of the second range A2. The specific range A2H is a high-speed low-load operating range where the engine speed is above the first speed N1 and the engine load is below a boundary load Tqs (given reference load). In the specific range A2H, the ECU 100 makes the main spark plug 32 perform main ignition, and then makes the subspark plug 62 perform subignition. That is, in the specific range A2H, a control in which the main ignition precedes the subignition is performed.

Further, in the specific range A2H, the ECU 100 performs different ignition controls bordering on a given second speed N2 (given reference engine speed) above the first speed N1. In detail, within the specific range A2H, in the high-speed range (for example, an operating point P2) where the engine speed is above the second speed N2, a control for retarding the timing of the subignition is performed, compared with the low-speed range below the second speed N2 (for example, an operating point P1 in FIG. 6). This retard control may be a control for stepwisely retarding the timing bordering on the second speed N2, or may be a control for linearly increasing the retard amount from the operating point P1 to the operating point P2.

In the specific range A2H where the engine body 2 is operated with a low load, the amount of air taken into the main combustion chamber 26 is comparatively small. That is, the amount of air is originally small because of the low load, and it is difficult for the mixture gas to be introduced into the subchamber 60. A misfire may still occur, even if the subignition is performed by the subspark plug 62 in the state where the sufficient mixture gas does not exist in the subchamber 60. When the misfire occurs, the flame cannot be blown off from the communicating holes 66 of the subchamber 60, and therefore, it cannot contribute to the combustion of the unburnt mixture gas which exists in the main combustion chamber 26.

Regarding this, in the specific range A2H, the ECU 100 performs the subignition after performing the main ignition. Therefore, the inflow of the mixture gas to the subchamber 60 is stimulated. That is, when the combustion pressure of the flame propagation combustion caused by the main ignition is overlapped with the pushing force of the piston 24, the force of pushing the mixture gas into the subchamber 60 increases. Therefore, as a result of stimulating the introduction of the mixture gas into the subchamber 60, the misfire does not occur, and the flame can be blown off from the subchamber 60 by the execution of the subignition. Therefore, the unburnt mixture gas which remains inside the main combustion chamber 26 can be combusted appropriately.

Further, in the comparatively high-speed operating range (for example, operating point P2) of the specific range A2H, the timing of the subignition is retarded compared with the comparatively low-speed operating range (for example, the operating point P1). The time which can be used for pushing the mixture gas into the subchamber 60 becomes shorter as the engine speed becomes higher. Regarding this, by retarding the timing of the subignition in the high-speed range, the period by the crank angle from the main ignition to the subignition can extended. Therefore, the time for pushing the mixture gas into the subchamber 60 by the combustion pressure of the flame propagation combustion can fully be secured. Therefore, the misfire of the subignition can further be suppressed.

Concrete Example Control in Specific Range

Figure 7:
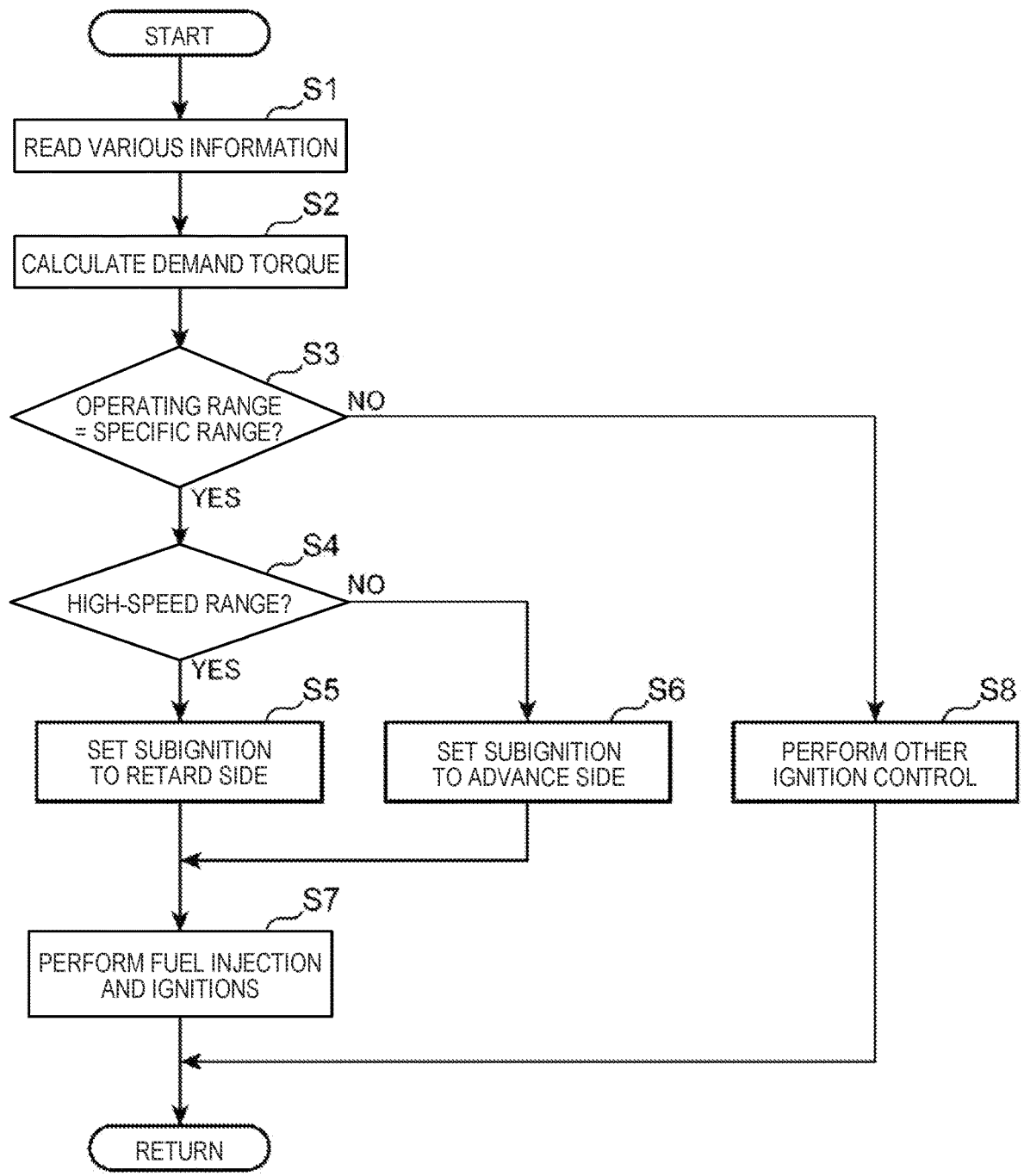
FIG. 7 is a flowchart illustrating one example of a control of a fuel injection and ignitions which is performed when the operating range is a specific range.

Next, a concrete example control in the specific range A2H is described. FIG. 7 is a flowchart illustrating one example of the fuel injection control of the injector 28, and the ignition control of the main spark plug 32 and the subspark plug 62 which are performed by the ECU 100 when the operating range falls within the specific range A2H.

If a given sampling period comes, the ECU 100 reads the variety of information from the various sensors SN 1-6 illustrated in FIG. 5, and other sensors (Step S1). For the fuel injection control and ignition control described above, the ECU 100 reads the engine speed detected by the crank angle sensor SN5, and the opening of the accelerator pedal detected by the accelerator opening sensor SN6.

Next, the ECU 100 calculates a demand torque which is a torque demanded for the engine body 2 (i.e., engine load) (Step S2). The ECU 100 calculates the demand torque (engine load) based on the engine speed and the opening of the accelerator pedal which are read at Step S1.

Next, the ECU 100 determines whether the operating point of the engine body 2 falls within the specific range A2H of the second range A2 (see the operation map in FIG. 6) (Step S3). In detail, the ECU 100 determines whether the current operating point of the engine is a point in the specific range A2H based on the engine speed read at Step S1 and the engine load calculated at Step S2.

If the operating point of the engine body 2 is not a point in the specific range A2H (NO at Step S3), the ECU 100 performs a control according to other operating ranges (i.e., the fuel injection control and the ignition control which are set beforehand for the first range A1, the third range A3, or a range of the second range A2 other than the specific range A2H) (Step S8). On the other hand, if the operating point of the engine body 2 is a point in the specific range A2H (YES at Step S3), the ECU 100 performs processings of Steps S4-S7. These processings set a fuel injection timing which is a timing at which the injector 28 begins the fuel injection, a main ignition timing which is a timing at which the main spark plug 32 performs the ignition (spark discharge), and a subignition timing which is a timing at which the subspark plug 62 performs the ignition (spark discharge).

If determined to be YES at Step S3, the ECU 100 sets the main ignition timing and the subignition timing so that the subignition is performed after performing the main ignition. Next, at Step S4, the ECU 100 determines whether the operating point of the engine body 2 falls within the high-speed range of the specific range A2H. If the operating point falls within the high-speed range (for example, operating point P2) which exceeds the second speed N2 in the specific range A2H (YES at Step S4), the ECU 100 sets the subignition timing on the retard side compared with the following low-speed range (Step S5). On the other hand, if the operating point falls within the low-speed range (for example, operating point P1) below the second speed N2 in the specific range A2H (NO at Step S4), the ECU 100 sets the subignition timing on the advance side compared with the high-speed range described above (Step S6). Note that the fuel injection timing is set to the given timing in intake stroke, either in the high-speed range or the low-speed range.

Then, the ECU 100 activates the injector 28 so that the fuel injection is started at the set fuel injection timing. Further, the ECU 100 activates the main spark plug 32 so that the main ignition is performed first, and then activates the subspark plug 62 so that the subignition is performed at the subignition timing set at Step S5 (retard side) or Step S6 (advance side) (Step S7). Note that, in an actual control, a control map in which the fuel injection timing, the main ignition timing, and the subignition timing are associated with the engine load and the engine speed is stored beforehand in a storage area of the ECU 100, and the fuel injection timing and the ignition timings are set with reference to the control map.

Figure 8:
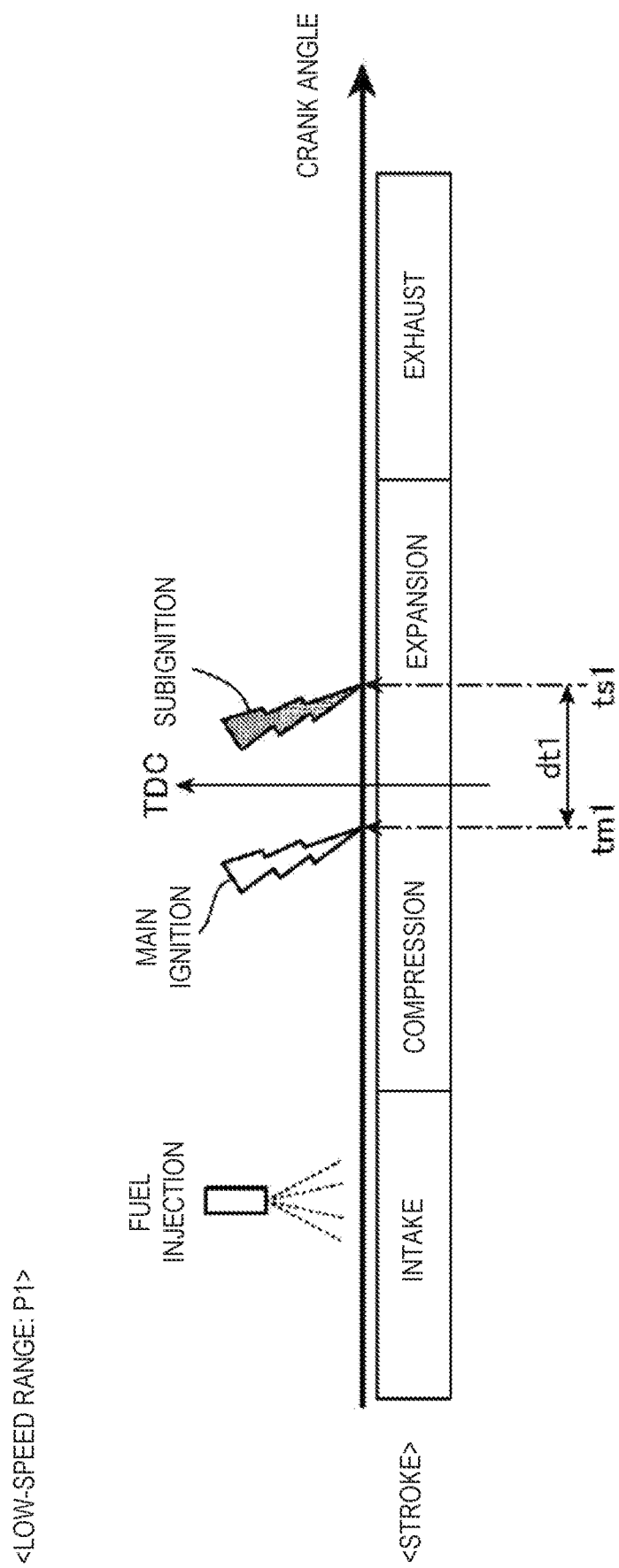
FIG. 8 is a time chart illustrating a fuel injection timing, a main ignition timing, and a subignition timing in a low-speed range of the specific range.

FIG. 8 is a time chart illustrating the fuel injection timing, the main ignition timing, and the subignition timing at the operating point P1 in the low-speed range of the specific range A2H. The fuel injection timing in the low-speed range is in intake stroke. In detail, the start timing and the end timing of the fuel injection from the injector 28 are set so as to be included in the intake stroke. This is because, in the specific range A2H, the demand for retarding the fuel injection timing for suppressing the preignition like the third range A3 is less. Note that the fuel injection end timing may be included in compression stroke.

As described above, in the specific range A2H, the main ignition precedes the subignition. Therefore, also in the low-speed range of the specific range A2H, a main ignition timing tm1 is set to a timing on the advance side of a subignition timing ts1. That is, the main ignition by the main spark plug 32 is first performed, and the subignition by the subspark plug 62 is then performed. The main ignition timing tm1 is set in the second half of compression stroke on the advance side of the compression TDC, and the subignition timing ts is set in the first half of expansion stroke on the retard side of TDC. By the preceding main ignition, the SI combustion of the mixture gas inside the main combustion chamber 26 begins. Since the specific range A2H is the low-load range, the amount of air taken into the main combustion chamber 26 is small, and therefore, it is difficult for the mixture gas to be introduced into the subchamber 60. However, by the assistance of the pressure increase accompanying the SI combustion, the unburnt mixture gas which remains inside the main combustion chamber 26 is pushed into the subchamber 60 through the communicating holes 66. Therefore, the sufficient amount of the mixture gas is introduced into the subchamber 60.

By the subignition following the main ignition, the mixture gas introduced into the subchamber 60 combusts. As described above, since the sufficient amount of the mixture gas is introduced into the subchamber 60, it is difficult for the misfire to occur, and the mixture gas inside the subchamber 60 combusts by the subignition. As a result, the flame can be blown off from the plurality of communicating holes 66 more securely. The flame makes the unburnt mixture gas inside the main combustion chamber 26 combust instantaneously. Therefore, fuel efficiency and emission performance can be improved.

Figure 9:
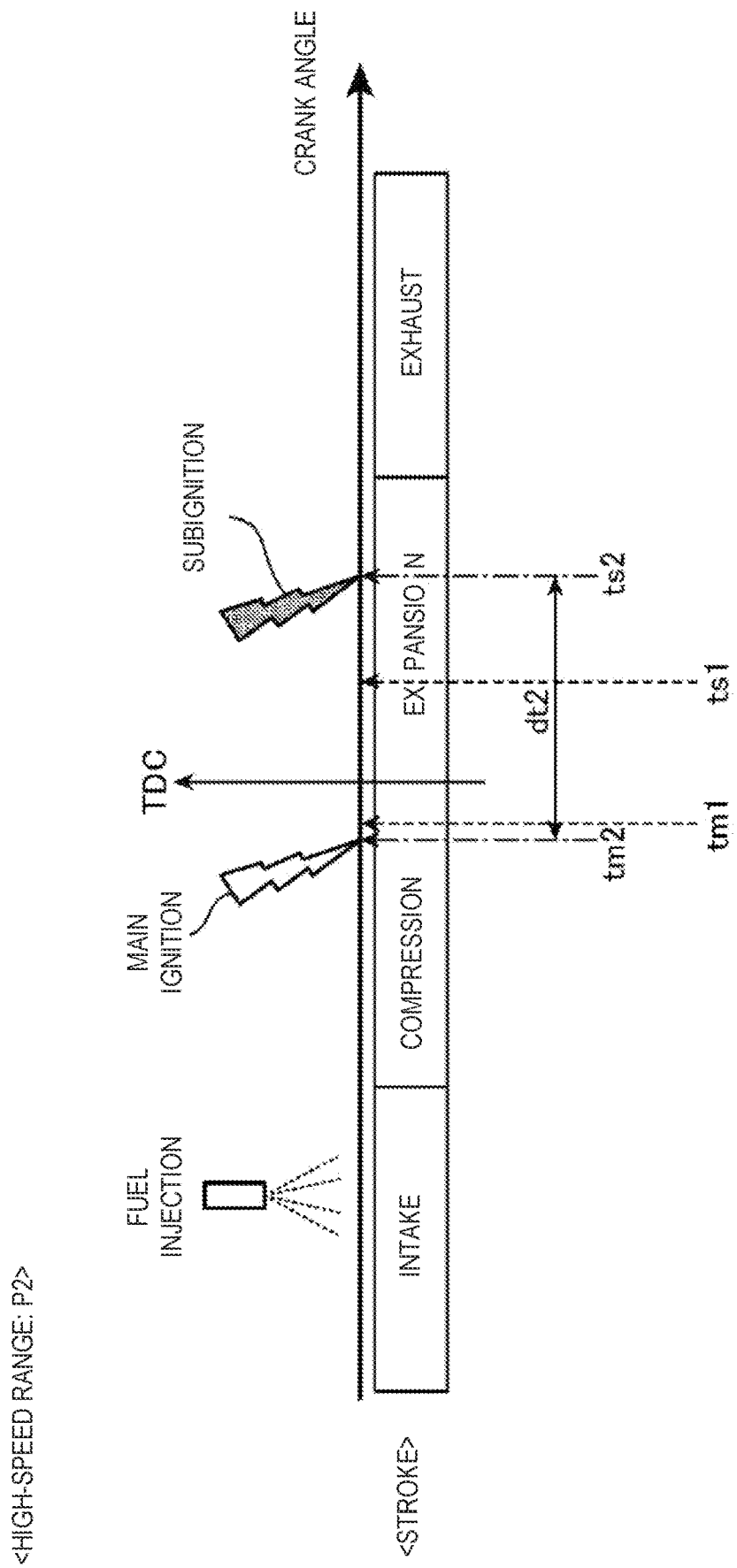
FIG. 9 is a time chart illustrating the fuel injection timing, the main ignition timing, and the subignition timing in a high-speed range of the specific range.

FIG. 9 is a time chart illustrating the fuel injection timing, the main ignition timing, and the subignition timing at the operating point P2 in the high-speed range of the specific range A2H. The fuel injection timing in the high-speed range is in intake stroke, similar to the low-speed range described above. A subignition timing ts2 in the high-speed range is set on the retard side of the subignition timing ts1 in the low-speed range. Further, a main ignition timing tm2 in the high-speed range is set on the advance side of the main ignition timing tm1 in the low-speed range.

The time which can be used for pushing the unburnt mixture gas into the subchamber 60 by the combustion pressure of the flame propagation combustion based on the main ignition becomes shorter as the engine speed becomes higher. Therefore, in the high-speed range, by retarding the subignition timing ts2 and advancing the main ignition timing tm2, a long period of time which can be used for the pushing can be secured. Therefore, the misfire of the subignition can further be suppressed.

Relationship Between Engine Speed and Ignition Control

Figure 10:
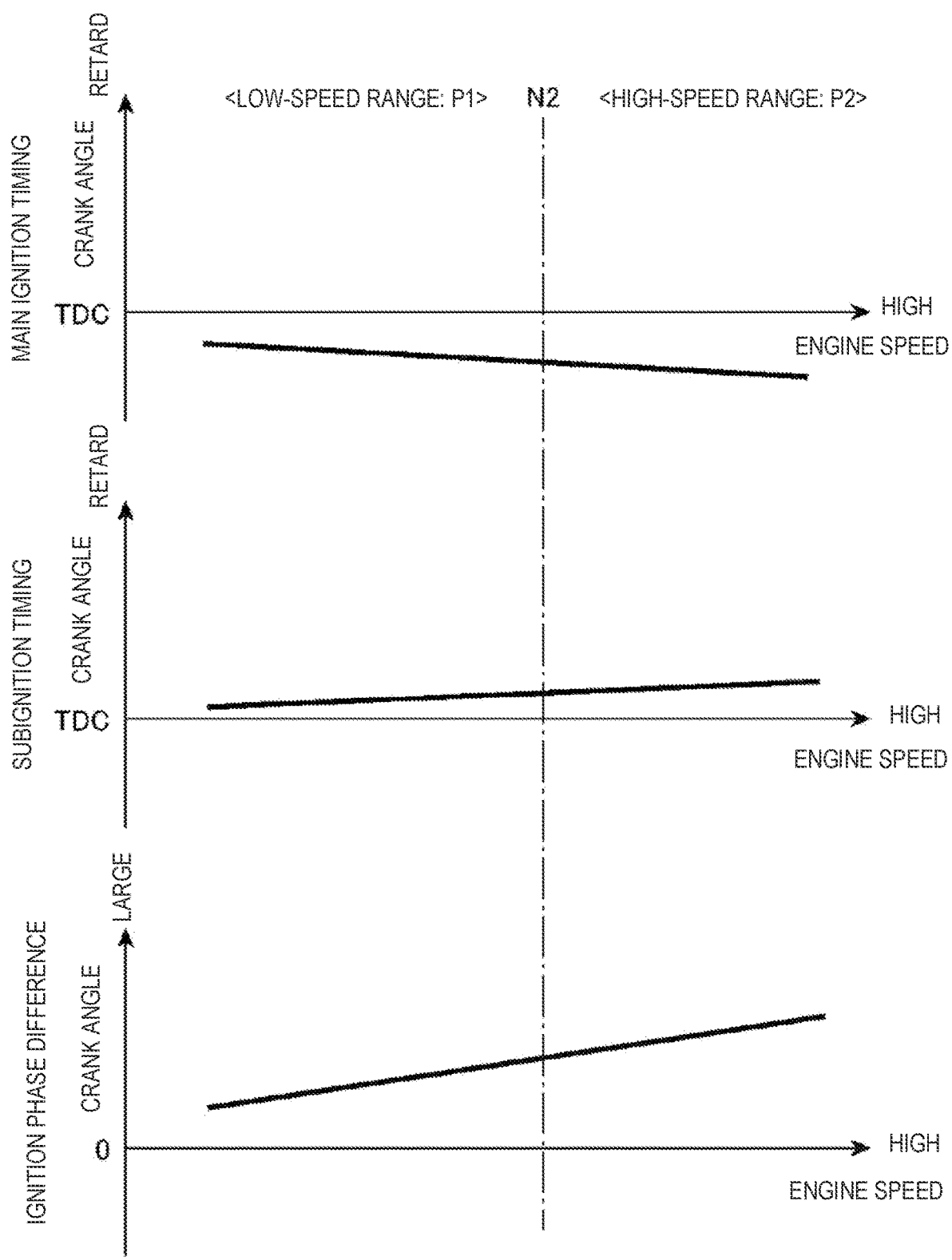
FIG. 10 is a chart illustrating a relationship between an engine speed, and the main ignition timing, the subignition timing, and an ignition phase difference, in the specific range.

FIG. 10 is a chart illustrating a relationship between the engine speed, and the main ignition timing (top graph in FIG. 10), the subignition timing (middle graph), and an ignition phase difference (bottom graph), in the specific range A2H. In FIG. 10, the low-speed range and the high-speed range are classified by using the second speed N2 as a reference engine speed. In each graph, the vertical axis is the crank angle, where the advance side of TDC is compression stroke, and the retard side is expansion stroke. In FIGS. 8 and 9, the example ignition controls at the specific operating point P1 in the low-speed range and the specific operating point P2 in the high-speed range are illustrated. In FIG. 10, a tendency of the ignition control in the entire engine speed range of the specific range A2H, which are performed by the ECU 100, is illustrated. Note that the chart of FIG. 10 illustrates the relationship between each parameter and the engine speed with the fixed engine load.

Since the main ignition is the first ignition in the entire speed range of the specific range A2H, the main ignition timing is set in compression stroke. The ECU 100 performs a control for advancing the main ignition timing as the engine speed becomes higher. By this control, the period by the crank angle for pushing the mixture gas into the subchamber 60 can be extended as the engine speed becomes higher. Therefore, the mixture gas can fully be pushed into the subchamber 60. Note that the advancing amount of the main ignition timing may not be linear as illustrated in FIG. 10, and, for example, the inclination may be changed bordering on the second speed N2, or it may be changed stepwisely.

Since the subignition timing is the succeeding ignition in the entire speed range, it is set in expansion stroke. The ECU 100 performs a control for retarding the subignition timing as the engine speed becomes higher. By this retard, the period from the main ignition to the subignition can be extended. Therefore, the time for pushed the mixture gas into the subchamber 60 can fully be secured, and the mixture gas inside the subchamber 60 can be combusted securely by the subignition.

As illustrated in FIGS. 8 and 9, ignition phase differences dt1 and dt2 are phase differences by the crank angle between the main ignition timings tm1 and tm2, and the subignition timings ts1 and ts2, respectively. As illustrated by the bottom graph in FIG. 10, in the specific range A2H, the ignition phase difference is set larger as the engine speed becomes higher (dt1<dt2). The increase in the ignition phase difference leads to the extension of the period between the main ignition as the preceding ignition and the subignition as the succeeding ignition. Therefore, the period for pushing the mixture gas into the subchamber 60 can fully be secured according to the engine speed.

Modifications

Although one embodiment of the present disclosure is described above, the present disclosure is not limited to the embodiment described above, and may be modified as follows.

(1) In the embodiment described above, the cover member 64 of the subignition unit 30 has the semicircular dome shape (FIG. 3), where the three communicating holes 66 (FIG. 4) are formed. The shape of the cover member 64 may be a different shape, such as a truncated cone shape and a rectangular parallelepiped shape. Further, the number and the size of communicating holes 66 may be set suitably. The attached position of the subignition unit 30 is not limited to the position in FIG. 2. For example, the subignition unit 30 may be provided on the intake port 8 side with respect to the tip-end part 28x of the injector 28.

(2) In the embodiment described above, the specific range A2H is set within the second range A2 (the minimum engine speed=N1). Alternatively, the minimum engine speed of the specific range A2H may be extended to the lower speed side of N1. That is, a high-speed part of the first range A1 illustrated in FIG. 6 may be incorporated into the specific range A2H.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
22 Cylinder
24 Piston
26 Main Combustion Chamber
28 Injector
30 Subignition Unit
32 Main Spark Plug
52 Cylinder Block
54 Cylinder Head
60 Subchamber
62 Sub spark Plug
64 Cover Member (Partition)
66 Communicating Hole
100 ECU (Controller)

A2H Specific Range (Low-Load Range below Reference Load)
P1 Operating Point in Low-speed Range
P2 Operating Point in High-speed Range
N2 Second Engine Speed (Given Reference Engine Speed)
Tqs Boundary Load (Given Reference Load)
tm Main Ignition Timing
ts Subignition Timing
dt Ignition Phase Difference

What is claimed is:

1. An engine system, comprising:
a cylinder block and a cylinder head that form a cylinder;
a piston reciprocatably accommodated in the cylinder;
a main combustion chamber defined by the cylinder block, the cylinder head, and the piston;
a subchamber that is separated from the main combustion chamber by a partition, and communicates with the main combustion chamber through a communicating hole formed in the partition;
an injector that injects fuel into the main combustion chamber;
a main spark plug that performs main ignition for igniting a mixture gas inside the main combustion chamber;
a subspark plug that performs subignition for igniting the mixture gas inside the subchamber; and
a controller that is electrically connected to, and outputs an electric signal for control to, the injector, the main spark plug, and the subspark plug,
wherein in a low-load range where an engine load is below a given reference load, the controller is configured to:
control the main spark plug and the subspark plug so that the subignition is performed after the main ignition; and
in a high-speed range where an engine speed is above a given reference engine speed, further advance a timing of the main ignition and further retard a timing of the subignition compared with a low-speed range where the engine speed is below the reference engine speed.

2. The engine system of claim 1, wherein the controller sets the timing of the main ignition in a second half of compression stroke on an advance side of a compression top dead center (TDC) and sets the timing of the subignition in a first half of expansion stroke on a retard side of the TDC.

3. The engine system of claim 1, wherein the controller sets an ignition phase difference between the subignition and the main ignition to be larger as the engine speed becomes higher.

4. The engine system of claim 1, wherein the main spark plug is attached so that an electrode part thereof is located on an intake port side in a ceiling surface of the main combustion chamber, and the subspark plug is attached to a position on an exhaust port side in the ceiling surface of the main combustion chamber.

5. The engine system of claim 2, wherein the main spark plug is attached so that an electrode part thereof is located on an intake port side in a ceiling surface of the main combustion chamber, and the subspark plug is attached to a position on an exhaust port side in the ceiling surface of the main combustion chamber.

6. The engine system of claim 3, wherein the main spark plug is attached so that an electrode part thereof is located on an intake port side in a ceiling surface of the main combustion chamber, and the subspark plug is attached to a position on an exhaust port side in the ceiling surface of the main combustion chamber.

7. The engine system of claim 4, wherein the injector is disposed so that a tip-end part thereof is located at the center of the ceiling surface of the main combustion chamber.

8. The engine system of claim 5, wherein the injector is disposed so that a tip-end part thereof is located at the center of the ceiling surface of the main combustion chamber.

9. The engine system of claim 6, wherein the injector is disposed so that a tip-end part thereof is located at the center of the ceiling surface of the main combustion chamber.

10. The engine system of claim 1, wherein in the low-load range where the engine load is below the given reference load, the injector injects fuel in intake stroke.

11. The engine system of claim 2, wherein in the low-load range where the engine load is below the given reference load, the injector injects fuel in intake stroke.

12. The engine system of claim 3, wherein in the low-load range where the engine load is below the given reference load, the injector injects fuel in intake stroke.

13. The engine system of claim 4, wherein in the low-load range where the engine load is below the given reference load, the injector injects fuel in intake stroke.

14. The engine system of claim 7, wherein in the low-load range where the engine load is below the given reference load, the injector injects fuel in intake stroke.

15. The engine system of claim 1, wherein in a low-speed low-load range where the engine speed is below a second given reference engine speed below the reference engine speed and the engine load is below a second given reference engine load higher than the reference engine load, the main ignition and subignition are suspended.

16. The engine system of claim 2, wherein in a low-speed low-load range where the engine speed is below a second given reference engine speed below the reference engine speed and the engine load is below a second given reference engine load higher than the reference engine load, the main ignition and subignition are suspended.

17. The engine system of claim 3, wherein in a low-speed low-load range where the engine speed is below a second given reference engine speed below the reference engine speed and the engine load is below a second given reference engine load higher than the reference engine load, the main ignition and subignition are suspended.

18. The engine system of claim 4, wherein in a low-speed low-load range where the engine speed is below a second given reference engine speed below the reference engine speed and the engine load is below a second given reference engine load higher than the reference engine load, the main ignition and subignition are suspended.

19. The engine system of claim 7, wherein in a low-speed low-load range where the engine speed is below a second given reference engine speed below the reference engine speed and the engine load is below a second given reference engine load higher than the reference engine load, the main ignition and subignition are suspended.

20. The engine system of claim 14, wherein in a low-speed low-load range where the engine speed is below a second given reference engine speed below the reference engine speed and the engine load is below a second given reference engine load higher than the reference engine load, the main ignition and subignition are suspended.

* * * * *